(12) United States Patent
Eckman et al.

(10) Patent No.: US 7,148,466 B2
(45) Date of Patent: Dec. 12, 2006

(54) APPARATUS AND METHOD FOR ILLUMINATION OF AN OPTICAL PLATEN

(75) Inventors: Ryan E. Eckman, Columbus TWP, MN (US); David Stoltzmann, Bayport, MN (US); Dean Rose, Shakopee, MN (US); Lubomir Koudelka, Shoreview, MN (US)

(73) Assignee: Identix Incorporated, Minnetonka, MN (US)

( * ) Notice: Subject to any disclaimer, the term of this patent is extended or adjusted under 35 U.S.C. 154(b) by 38 days.

(21) Appl. No.: 10/741,813

(22) Filed: Dec. 18, 2003

(65) Prior Publication Data

US 2004/0212896 A1    Oct. 28, 2004

Related U.S. Application Data

(60) Provisional application No. 60/436,328, filed on Dec. 23, 2002.

(51) Int. Cl.
*G06K 9/20* (2006.01)

(52) U.S. Cl. ............................ 250/221; 382/124

(58) Field of Classification Search ............. 250/208.1, 250/221; 359/2, 362, 363, 364; 382/124; 355/1; 358/400
See application file for complete search history.

(56) References Cited

U.S. PATENT DOCUMENTS

| 5,416,573 | A | 5/1995 | Sartor, Jr. ................. 356/71 |
| 5,528,355 | A | 6/1996 | Maase et al. .............. 356/71 |
| 5,732,148 | A | 3/1998 | Keagy et al. ............. 382/124 |
| 5,737,439 | A | 4/1998 | Lapsley et al. ........... 382/115 |
| 6,175,407 | B1 | 1/2001 | Sartor ........................ 356/71 |
| 6,292,576 | B1* | 9/2001 | Brownlee ................. 382/124 |
| 2002/0131624 | A1* | 9/2002 | Shapiro .................... 382/124 |

* cited by examiner

*Primary Examiner*—Thanh X. Luu
*Assistant Examiner*—Tony Ko
(74) *Attorney, Agent, or Firm*—Beyer Weaver & Thomas, LLP.

(57) ABSTRACT

An apparatus for optically imaging an object includes an optical platen having an object receiving surface. The object receiving surface is directly illuminated by a first light source, and is illuminated by total internal reflection by a second light source.

24 Claims, 2 Drawing Sheets

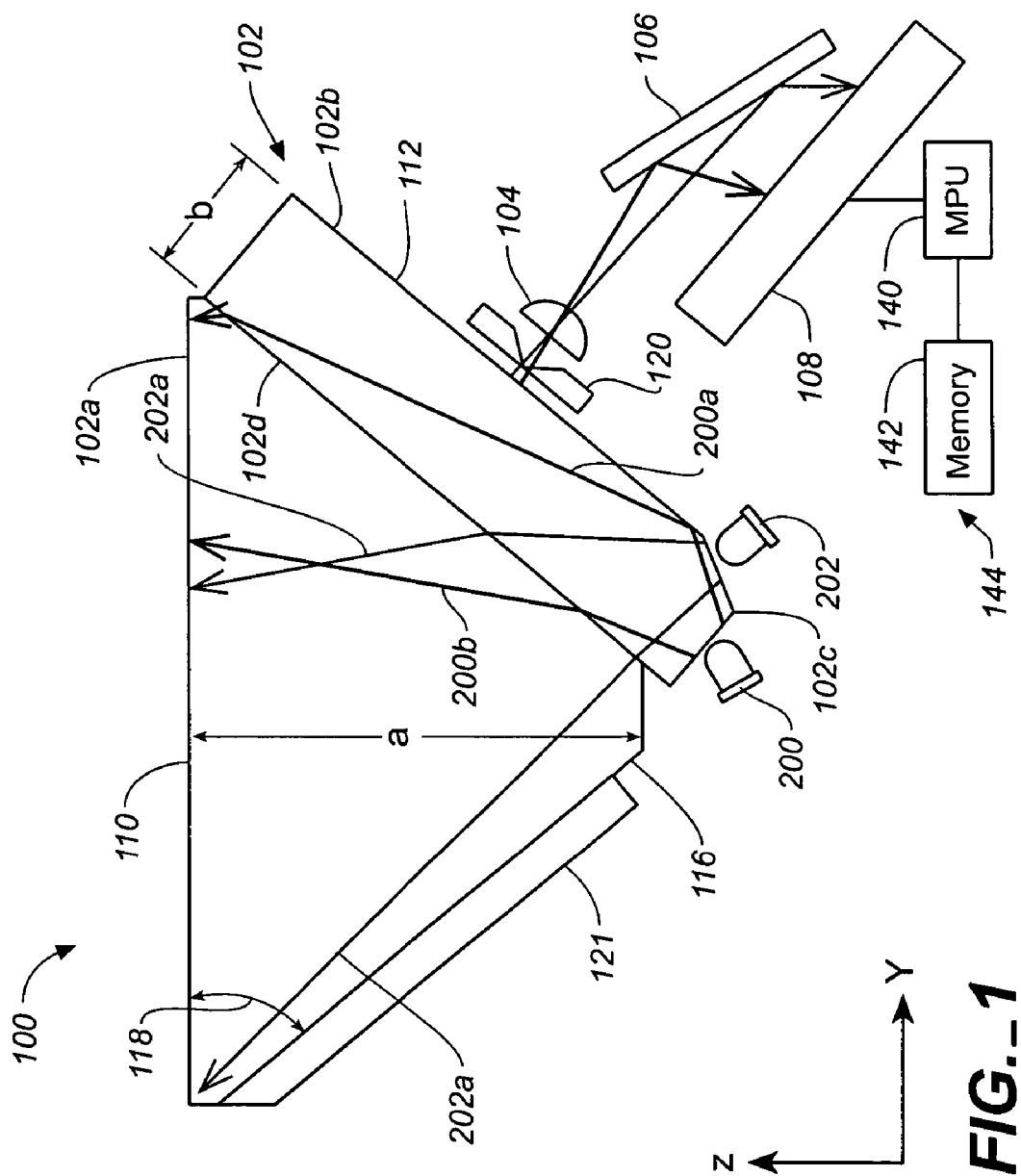
FIG._1

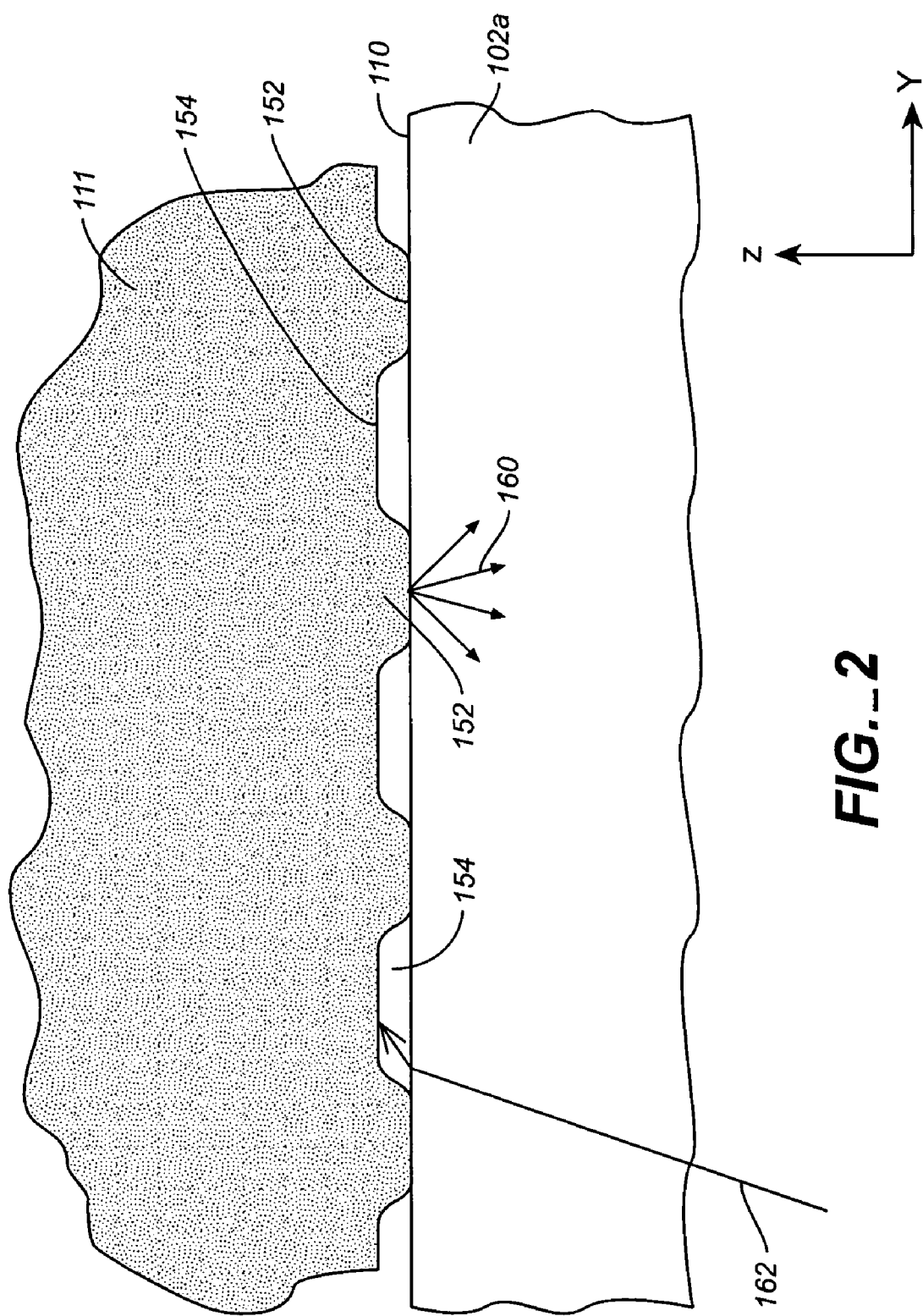
FIG._2

APPARATUS AND METHOD FOR ILLUMINATION OF AN OPTICAL PLATEN

CROSS REFERENCE TO RELATED APPLICATIONS

This application claims priority under 35 U.S.C. 119(e) to the provisional application entitled: "Apparatus And Method For Dual Beam Illumination Of A Platen", U.S. Ser. No. 60/436,328, filed Dec. 23, 2002, which is incorporated herein by reference.

TECHNICAL FIELD

This invention relates to imaging devices for use, for example, with fingerprint matching systems.

BACKGROUND

Up-to-date fingerprint matching systems using fingerprint image transfer into electronic data usually apply the known contact method to create a fingerprint pattern. A surface topography of a finger is approximated by a series of ridges with intermediate valleys. When a finger is applied to a surface of a transparent optical plate or prism, the ridges contact the optical plate while the valleys do not and instead serve to form the boundaries of regions of air and/or moisture.

The finger to be imaged is illuminated by a light source located below or near to the optical plate. Imaging light from the light source is incident on the surface of the optical plate at an angle of incidence measured with respect to a normal to that surface. Imaging light reflected from the surface is detected by an imaging system that usually includes some form of a detector.

Components of a typical fingerprint imaging system are oriented so that an angle of observation (defined to be an angle between an optical axis of the imaging system and the normal to the optical plate surface) is greater than a critical angle for the interface between the surface and the air at the surface. The critical angle at the surface/air interface is defined as the smallest angle of incidence for which imaging light striking the surface/air interface is totally internally reflected (TIR) within the optical plate. Therefore, the critical angle at the surface/air interface depends on the index of refraction of the air and the optical plate. Another constraint for the angle of observation arises because there is incentive to observe the image at the smallest practical angle of observation, as this reduces distortion due to object tilting. Therefore, the angle of observation is typically chosen to be close to, but greater than the critical angle at the surface/air interface.

At locations where the ridges of the finger contact the surface of the optical plate, total internal reflection does not occur because the index of refraction of a finger is larger than that of air. In this case, light incident on the surface of the optical plate at a location where the ridge of the finger contacts the surface is refracted through the surface/finger interface and then scattered in transmission and reflection upon contact with the finger. In this case, only a small fraction of incident illumination is reflected back to a detector of the imaging system.

The imaging system may be implemented to produce bright components at valley locations and dark components at ridge locations, thus producing a dark or positive fingerprint pattern. Here, the imaging system detects the light reflected from the surface/air interface and is called specular or bright field illumination. Alternatively, the imaging system may be implemented to produce bright components at ridge locations and dark components at valley locations, thus producing a bright or negative fingerprint pattern. In this case, the imaging system detects a small percentage of the illumination that is diffused upon contact with the finger, which is a dark field illumination scheme.

SUMMARY

In one aspect, the invention features an apparatus for optically imaging an object. The apparatus includes an optical platen having an object receiving surface. A first light source is positioned to directly illuminate the object receiving surface. A second light source is positioned to illuminate the object receiving surface by total internal reflection. An imaging system is positioned to receive light from the object receiving surface to form an image of the object on that surface.

Various implementations of the invention may include one or more of the following features. The second light source illuminates the object receiving surface off of reflected angles through which the object receiving surface is viewed by the imaging system. The object receiving surface has a first index of refraction and another part of the optical platen has a second index of refraction that is less than the first index of refraction. The first and second light sources are positioned at another part of the optical platen. The object-receiving surface includes SF11 glass, and the other part of the optical plat includes BK7 glass. The platen is made of first and second parts, each comprising different materials. The first part forms the object receiving surface and the first part is thicker than the second part. The first and second light sources are a light emitting diode, a laser, or a laser diode. The imaging system includes an aperture at a second surface of the optical platen, an objective at the aperture, and a detector to receive light collected by the aperture and the objective. The imaging system further includes a reflective surface positioned between the objective and the detector to collect light from the objective and to focus the light onto the detector. The detector is either a CCD or CMOS sensor. The aperture defines a beam of light rays used by the detector. Light from the first and second light sources illuminates the optical platen at an angle with respect to a normal to the object receiving surface which is less than a particular critical angle. The object receiving surface is approximately 3.2 inches in length and approximately 2.4 inches in width. The object to be imaged is a finger.

In yet another aspect, an embodiment of the invention features an apparatus for optical imaging features on a surface of a hand. The apparatus comprises an optical platen means for forming a finger receiving surface. A first light source means directly illuminates the finger receiving surface, and a second light source means illuminates the finger receiving surface by total internal reflection. An imaging means receives light from the finger receiving surface to form an image of a finger on the finger receiving surface.

In still another aspect, an embodiment of the invention features a method of imaging an object. The method comprises receiving an object at an object receiving surface of an optical platen. The object receiving surface is directly illuminated with a first light source. The object receiving surface is also illuminated with a second light source by total internal reflection. Light from the object receiving surface is collected at an imaging system to form an image of the object.

Various implementations of the invention may include one or more of the following features. The object receiving surface has a first index of refraction and a second part of the optical platen has a second index of refraction that is less than the first index of refraction. The first and second light sources are positioned at the second part of the optical platen. The received object is a finger. Light from the first and second light sources illuminating the optical platen is incident on the optical platen at an angle with respect to a normal to the object receiving surface which is less than a particular critical angle.

The invention can include one or more of the following advantages. The apparatus can provide moisture discrimination by using a thin high index of refraction glass, for example. This reduces the cost and size of the apparatus. The apparatus can minimize latent images if designed properly. Additionally, the apparatus can improve uniformity of illumination across the object receiving surface. The apparatus, because of its compact size, may be used in portable and/or compact electronic devices, such as, for example, computer notebooks, personal digital assistants, and cellular or land-based telephones.

The details of one or more embodiments are set forth in the accompanying drawings and the description below. Other features, objects and advantages will be apparent from the description and drawings, and from the claims.

DESCRIPTION OF DRAWINGS

FIG. 1 shows schematically a side sectional view of an imaging apparatus according to the present invention.

FIG. 2 schematically illustrates an object receiving surface of an optical platen of the imaging apparatus of FIG. 1, with a finger imaged on the optical platen.

DETAILED DESCRIPTION

As there are advantages to using the fingerprint as an identifier, which cannot be forgotten or lost, the field of application for fingerprint imaging devices is constantly expanding. For example, a fingerprint may be used as an access key. For instance, it may be used to access resources of different portable personal electronic apparatus. Thus, it becomes beneficial to miniaturize the fingerprint imaging device for use with such portable apparatus.

A fingerprint imaging device with a compact configuration may be implemented in a mass-produced apparatus, such as a portable electronic apparatus. Examples of portable electronic apparatus include cellular telephones, personal computers, such as notebooks, and personal digital assistants. For economic reasons, it is important that a fingerprint imaging device can be built into the portable electronic apparatus with substantially no changes in the design of those apparatus. This requirement may be met by a relatively flat configuration of the fingerprint imaging device.

As shown in FIGS. 1 and 2, a fingerprint imaging device 100 includes an optical plate or platen 102, an objective 104, a mirror 106, an image sensor 108, and illuminating tools 200 and 202. For further reference, directions Y and Z of the orthogonal coordinate system are shown by arrows. A third direction X of this orthogonal coordinate system is perpendicular to the drawing plane of FIG. 1.

The optical platen 102 includes an object receiving surface or finger field 110 located on its top. An object 111, such as a finger, to be identified is applied to the finger field 110. The finger field 110 has an optically smooth surface to provide good contact with the finger skin ridges. The finger field regions that interface with the finger skin ridges and valleys form the fingerprint pattern. The finger field 110 has dimensions sufficient for reliable identification of the fingerprint pattern. The object receiving surface can be large enough to provide sufficient X-Y dimensions to image four fingers at the same time. The surface of the object receiving surface in the X-Y plane may be about 3.2 inches in length (the X-direction) and about 2.40 inches in width (the Y-direction).

The mirror 106 may be any mirror or other reflective surface coated to reflect light of a wavelength produced by the one or more illuminating tools. The image sensor 108 may be a single crystal CMOS image sensor, produced by Motorola Co., Inc. Alternatively, the image sensor may be a conventional charge coupled device (CCD) array. The detector array may comprise about 1600×1200 pixels providing a relatively large field of view (FOV) for the system.

The optical plate 102 includes a first side surface 112 and a second side surface 116 inclined to the finger field 110. The finger field 110 and the surface 116 are planar in shape. Other shapes are possible for either or both of these surfaces, such as, for example, cylindrical shapes, to enhance various characteristics of the fingerprint image. The surface 116 is inclined to the finger field 110 at an angle 118, as shown in FIG. 1. The value of angle 118 is generally set normal to the local optical axis ±10°.

The objective 104 has an aperture stop 120 that is positioned external to the optical plate 102 and behind its lateral surface 112. The aperture stop 120 defines an aperture light beam of imaging light rays forming the image of a fingerprint pattern.

The objective 104 may include, for example, a converging lens such as a planoconvex lens, which provides reasonable image quality at a reasonable cost. Alternatively, to reduce non-planarity of the image surface (which may arise when using a planoconvex lens), the objective may include a diverging lens.

An optical material 121 may be positioned at the surface 116. The optical material has absorptive properties. The optical material, for example, may be a deposited layer of paint or a light absorbing glass. The optical material 121 functions as a light dump.

The objective 104 may have its object side focal point located approximately at the focal plane of the finger field. The objective 104 produces conjugate images of the platen surface 110 and the image sensor 108. The objective 104 may contain several anamorphic elements to compress the field of view such that a low-distortion image of the platen surface 110 is produced with the desired image scaling at sensor 108.

The optical plate 102 may be made of two different materials. One part 102a of the optical plate may be made of material that has an index of refraction that is greater than the index of refraction of the other part 102b of the optical plate. Thus, the index of refraction of the optical plate part 102a that forms the object receiving surface 110 is greater than that part of the optical plate 102b through which light from the light sources 200 and 202 are directed.

In one particular embodiment, the optical plate part 102a may be made of SF11 glass (index of refraction=1.785) available from Schott, while the optical plate part 102b is made from the lower index of refraction glass BK7 (index of refraction=1.517), for example, which is also available from Schott. Other transparent materials, glass or plastics, for instance, may be used in place of these specific glasses. The index of refraction of the optical plate part 102b, however, should be less than that of the optical plate part 102a. This allows the optical plate part 102a to be made thinner than would otherwise be the case.

In one embodiment, the thickness "a" of the optical plate part 102a may be about 40 millimeters(mm), and the thickness "b" of the optical plate part 102b may be about 12 mm. The parts 102a and 102b are joined together, for example, by an adhesive with an index of refraction between that of parts 102a and 102b, such as Norland 61 (index of refraction=1.56) available from Norland.

The illumination tools 200 and 202 are located adjacent to the optical plate part 102b. The illuminating tools 200 and 202, for example, can be coupled to the optical plate part 102b through angles cut in a surface 102c of that part.

As shown in FIG. 1, the illuminating tools 200 and 202 are arranged and operated to illuminate the finger field 110. The illuminating tools may be radiation sources such as light emitting diodes, lasers or laser diodes. The illuminating tools 200 and 202 are represented by an array of light-emitting diodes irradiating in the red spectral region, with a spectral full-width half maximum (FWHM) of approximately 25 nanometers (nm).

The illumination tool 200 is positioned to illuminate the object receiving surface 110, as represented by light ray 200a, by total internal reflection (TIR) off of a surface 112 of the optical plate 102b. The illumination tool 202, on the other hand, is positioned to directly illuminate the object receiving surface 110, as represented by light rays 202a. However, some of the illumination from the illuminating tool 200, as represented by light ray 200b, also directly illuminates the surface 110.

The illuminating tools provide uniform illumination at the surface 110. This reduces the need for any sort of gain compensation system, reduces noise and improves grayscale contrast. Additionally, the illumination scheme will not present latent images. Latent images, for example, are caused by oil residue on the finger. Thus, this illumination scheme provides a relatively high contrast ratio with low noise.

The surface 112 and the air interface are defined by a critical angle $\theta_{CR}$, which is the smallest angle of incidence for which light striking the interface is totally internally reflected within the optical plate 102. The critical angle $\theta_{CR}$ at this interface depends on the indices of refraction of the air and the optical plate part 102b. The value of the critical angle $\theta_{CR}$ is given by Snell's Law as:

$$\sin(\theta_{CR}) = \frac{n}{n_1}, \quad (1)$$

where $n_1$ is the index of refraction of the optical plate part 102b and n is the index of refraction of air (n≅1). Thus, if the optical plate part 102b is made of the BK7 glass, which has an index of refraction of 1.517 ($n_1$), then the critical angle $\theta_{CR}$ would be 41°. In that case, the angle of incidence (relative to the normal of the surface 112) of light striking the surface 112 from the illumination tool 200 needs be approximately greater than 41° to permit illumination of the surface 110 by TIR at the surface 112. In the one particular embodiment, the incident angles used to illuminate surface 110 range from about 41° to 70°.

Light from the illumination tool 202, on the other hand, passes through an interface 102d between the optical plate parts 102a and 102b. It is refracted at that interface, before directly illuminating the surface 110.

Referring to FIG. 2, in operation, a finger 111 to be imaged is placed on the surface 110 and is illuminated by the light sources 200 and 202. Light from the light sources is incident on the surface 110 at an angle of incidence measured with respect to a normal to the surface 110. Light from a light source that strikes the surface 110 at an angle greater than a particular critical angle is totally internally reflected from the surface 110. However, because the light sources are located generally below the optical plate surface, a large portion of the light striking the surface enters at an angle of incidence that is less than the particular critical angle, thus increasing the amount of light entering the finger and diffusely scattering into the imaging path.

Some light rays strike a portion of the surface 110 that is contacted by a ridge 152. Those light rays are not totally internally reflected. They are scattered in transmission and reflection. Thus, these light rays, for example, light rays 160, reach the detector 108.

Some light rays, for example, light rays 162, strike a portion of the surface 110 that is not contacted by a ridge 152 but is instead contacted by the pocket of air and/or moisture formed by a valley 154. However, because of the location of the light sources relative to the optical plate surface, the light striking the surface 110 enters at an angle of incidence that is generally less than the particular critical angle. Accordingly, those light rays are refracted through the surface 110, exit through the optical plate into the finger, scatter, and contribute to the light reaching the detector 108 via the ridge 152. In this way, the detector detects a light fingerprint image formed on a dark background, called a negative image. This illumination scheme thus presents a dark field when the illumination tools are on and no contact is made to the surface 110.

More specifically, the surface 110 and the air interface is defined by a critical angle $\theta_{CR1}$, which is the smallest angle of incidence for which light striking the interface is totally internally reflected within the optical plate 102. The critical angle $\theta_{CR1}$ at this interface depends on the indices of refraction of the air and the optical plate part 102a. The value of the critical angle $\theta_{CR1}$, as discussed, is given by Snell's Law as:

$$\sin(\theta_{CR1}) = \frac{n}{n_2}, \quad (2)$$

where $n_2$ is the index of refraction of the optical plate part 102a and n is the index of refraction of air. Thus, if the optical plate part 102a is made of the SF11 glass, which has an index of refraction of 1.785 ($n_2$), then the critical angle $\theta_{CR1}$ would be 34°. In that case, the angle of incidence (relative to the normal of the surface 110) of light striking the surface 110 needs to be less than 34° to permit negative fingerprint imaging of the fingerprint pattern.

Additionally, the surface 110 and the finger ridge interface is defined by a critical angle $\theta_{CR2}$, which is the angle of incidence for which light striking the surface/ridge interface is totally internally reflected within the optical plate. Critical angle $\theta_{CR2}$ depends on the indices of refraction of the finger skin and the optical plate part 102a. The value of the critical angle $\theta_{CR2}$ is given by Snell's Law as:

$$\sin(\theta_{CR2}) = \frac{n_3}{n_2}, \quad (3)$$

where $n_3$ is the index of refraction of the finger and $n_2$ is that of SF11. Thus, if the finger skin has an index of refraction of 1.44, then the critical angle $\theta_{CR2}$ is 54°. Therefore, to permit negative fingerprint imaging of the fingerprint pattern, an angle of incidence (relative to the normal of the surface 110) of light striking the surface 110 needs to be less than 54°.

Thus, when a finger is applied to the finger field 110, the TIR conditions are not met for light from the illuminating tools 200 and 202. Imaging light rays penetrate through the surface of the finger field 110 and illuminate the finger skin. Imaging light rays scattered from the ridges pass back into the optical plate 102 in accordance with the refraction law at angles to the normal of the surface not exceeding the critical total internal reflection angle at the interface with the ridges.

If the detected light is observed at an angle greater than the critical angle for the platen/air interface, very little reflected light is detected. However, a small amount of light which strikes the finger ridges is reflected along the angle of observation. These imaging light rays create the negative fingerprint pattern formed by the bright regions corresponding to the ridges of the finger skin, as the light from the valleys of the finger skin do not enter the imaging path and produce a dark background.

Also, the optical layout of the apparatus may be configured to provide moisture discrimination as described in U.S. Pat. No. 5,416,573, issued May 16, 1995, entitled "Apparatus For Producing Fingerprint Images Which Are Substantially Free Of Artifacts Attributable To Moisture On The Finger Being Imaged", assigned to the assignee of the subject application, and which is herein incorporated by reference. Specifically, the detector 100 receives light with an axis of propagation that is at an angle relative to a normal to the platen surface where the angle is greater than the critical angle ($\theta_{CR1}$) corresponding to an interface of the surface 110 and water, and less than the critical angle ($\theta_{CR2}$) corresponding to the interface of the platen and the finger being imaged. In the one particular embodiment, this angle is selected to be about 48 to 54°.

Generally, moisture discrimination requires the use of high index of refraction glass, for example, the SF11 glass, to implement TIR with acceptable geometric distortion. To implement moisture discrimination in combination with a large FOV requires a thick piece of SF11 glass, on the order of 40 mm.

The use of the lower index of refraction glass for the optical plate part 102b permits, as noted, the use of thinner glass, for example, the SF11 glass, for optical plate part 102a. This provides a more compact means for the light to illuminate a large FOV for the imaging system 144. This configuration also provides a system that has adequate moisture discrimination, while reducing the cost and size of the imaging apparatus.

The illuminating tools 200 and 202 are located generally below the optical plate. The thickness of the optical plate 102 is determined by the size of the illuminating tools 200 and 202, and the height constraint of the fingerprint imaging device 100 in the Z direction. This height is constrained by cost and generally should remain under 40 mm for an object FOV with dimensions larger than 40 mm.

Additionally, as shown in FIG. 1, the fingerprint imaging device 100 may include a microprocessor unit (MPU) 140 for, among other things, comparing fingerprint image data from the image sensor 108 to fingerprint image data, for example, of an authorized user stored in a memory 142. The MPU 140 also controls the operation of the image sensor 108, and the illumination tools 200 and 202. The image sensor 108, the MPU 140, and the memory 142 are part of a fingerprint imaging system 144. The imaging lens 104, the mirror 106 and the aperture stop 120 are also part of the imaging system 144.

A number of implementations and techniques have been described. However, it will be understood that various modifications may be made to the described components and techniques. For example, advantageous results still could be achieved if steps of the disclosed techniques were performed in a different order, or if components in the disclosed systems were combined in a different manner, or replaced or supplemented by other components.

For example, the optical layout of the imaging device 100 may use other or additional components than, for instance, the lens 104 and the aperture 120 described above. Also, objects other than a finger may be imaged by the imaging device.

Additionally, the light from the illuminating tools 200 and 202 may be made diffuse by machining or otherwise altering the surface 102c to make that surface diffuse. This is done to spread out the light from the illuminating tools 200 and 202, thereby making the illumination more uniform.

A number of embodiments of the invention have been described. Nevertheless, it will be understood that various modifications may be made without departing from the spirit and scope of the invention.

What is claimed is:

1. An apparatus for optically imaging an object comprising:
    an optical platen having an object receiving surface;
    a first light source positioned to directly illuminate the object receiving surface;
    a second light source positioned to illuminate the object receiving surface by light first totally internally reflected at another surface other than the object receiving surface; and
    an imaging system positioned to receive light from the object receiving surface to form an image of the object on the object receiving surface.

2. The apparatus of claim 1 wherein the second light source is positioned to illuminate the object receiving surface off of reflected angles through which the object receiving surface is viewed by the imaging system.

3. The apparatus of claim 1 wherein the object receiving surface has a first index of refraction and another part of the optical platen has a second index of refraction that is less than the first index of refraction.

4. The apparatus of claim 3 wherein the first and second light sources are positioned at the another part of the optical platen.

5. The apparatus of claim 3 wherein the object receiving surface includes SF11 glass and the another part of the optical platen includes BK7 glass.

6. The apparatus of claim 1 wherein the platen is made of first and second parts, each comprising different materials, the first part forming the object receiving surface and the first part being thicker than the second part.

7. The apparatus of claim 1 wherein the first and second light sources are light emitting diodes.

8. The apparatus of claim 1 wherein the first and second light sources are selected from the group consisting of a light emitting diode, a laser and a laser diode.

9. The apparatus of claim 1 wherein the imaging system includes an aperture at a second surface of the optical platen, an objective at the aperture, and a detector to receive light collected by the aperture and the objective.

10. The apparatus of claim 9 wherein the imaging system further includes a reflective surface positioned between the objective and the detector to collect light from the objective and to focus the light onto the detector.

11. The apparatus of claim 7 wherein the detector is either CCD or CMOS sensor.

12. The apparatus of claim 7 wherein the aperture defines a beam of light rays used by the detector.

13. The apparatus of claim 1 wherein the first and second light sources are positioned such that light illuminating the optical platen is incident on the optical platen at an angle with respect to a normal to the object receiving surface which is less than a particular critical angle.

14. The apparatus of claim 1 wherein the object receiving surface is approximately 3.20 inches in length and approximately 2.40 inches in width.

15. The apparatus of claim 1 wherein the object is a finger.

16. An apparatus for optically imaging features on a surface of a hand comprising:
an optical plate means for forming a finger receiving surface;
a first light source means for directly illuminating the finger receiving surface;
a second light source means for illuminating the finger receiving surface by light first totally internally reflected at another surface other than the finger receiving surface; and
an imaging means for receiving light from the finger receiving surface to form an image of a finger on the finger receiving surface.

17. A method of imaging an object comprising:
receiving an object at an object receiving surface of an optical platen;
directly illuminating the object receiving surface with a first light source;
illuminating the object receiving surface with a second light source by light first totally internally reflected at another surface other than the object receiving surface;
collecting light from the object receiving surface; and
receiving the collected light at an imaging system to form an image of the object.

18. The method of claim 17 wherein the object receiving surface has a first index of refraction and a second part of the optical platen has a second index of refraction that is less than the first index of refraction.

19. The method of claim 18 wherein the first and second light sources are positioned at the second part of the optical platen.

20. The method of claim 17 wherein the received object is a finger.

21. The method of claim 17 wherein light from the first and second light sources illuminating the optical platen is incident on the optical platen at an angle with respect to a normal to the object receiving surface which is less than a particular critical angle.

22. An apparatus for optically imaging an object comprising:
an optical platen having an object receiving surface wherein the object receiving surface has a first index of refraction and another part of the optical platen has a second index of refraction that is less than the first index of refraction;
a first light source positioned to directly illuminate the object receiving surface;
a second light source positioned to illuminate the object receiving surface by light totally internally reflected at another surface other than the object receiving surface; and
an imaging system positioned to receive light from the object receiving surface to form an image of the object on the object receiving surface.

23. An apparatus for optically imaging an object comprising:
an optical platen having an object receiving surface wherein the platen is made of first and second parts, each comprising different materials, the first part forming the object receiving surface and the first part being thicker than the second part;
a first light source positioned to directly illuminate the object receiving surface;
a second light source positioned to illuminate the object receiving surface by light totally internally reflected at another surface other than the object receiving surface; and
an imaging system positioned to receive light from the object receiving surface to form an image of the object on the object receiving surface.

24. A method of imaging an object comprising:
receiving an object at an object receiving surface of an optical platen wherein the object receiving surface has a first index of refraction and a second part of the optical platen has a second index of refraction that is less than the first index of refraction;
directly illuminating the object receiving surface with a first light source;
illuminating the object receiving surface with a second light source by light totally internally reflected at another surface other than the object receiving surface;
collecting light from the object receiving surface; and
receiving the collected light at an imaging system to form an image of the object.

* * * * *